United States Patent
Darbinyan et al.

(10) Patent No.: US 7,673,264 B1
(45) Date of Patent: Mar. 2, 2010

(54) SYSTEM AND METHOD FOR VERIFYING IP INTEGRITY IN SYSTEM-ON-CHIP (SOC) DESIGN

(75) Inventors: Karen Darbinyan, Fremont, CA (US); Hayk Chukhajyan, Yerevan (AM); Albert Harutyunyan, Yerevan (AM); Yervant Zorian, Santa Clara, CA (US)

(73) Assignee: Virage Logic Corp., Fremont, CA (US)

( * ) Notice: Subject to any disclaimer, the term of this patent is extended or adjusted under 35 U.S.C. 154(b) by 370 days.

(21) Appl. No.: 11/732,900

(22) Filed: Apr. 5, 2007

Related U.S. Application Data (60) Provisional application No. 60/789,784, filed on Apr. 6, 2006.

(51) Int. Cl.
*G06F 17/50* (2006.01)
(52) U.S. Cl. .................................. 716/5; 716/7; 716/16
(58) Field of Classification Search .............. 716/1–5, 716/7, 16–18; 703/13–15, 20, 23, 27
See application file for complete search history.

(56) References Cited

U.S. PATENT DOCUMENTS

| | | | |
|---|---|---|---|
| 6,480,815 B1 * | 11/2002 | Olson et al. | 703/14 |
| 7,243,312 B1 * | 7/2007 | Lysaght et al. | 716/2 |
| 2006/0184350 A1 * | 8/2006 | Huang et al. | 703/26 |

* cited by examiner

*Primary Examiner*—Paul Dinh
(74) *Attorney, Agent, or Firm*—The Danamraj Law Group, P.C.

(57) ABSTRACT

An intellectual property (IP) integrity verification system and method operable with respect to integrating an IP design into a user's embedded IC design. In one embodiment, the IP design is partitioned into a plurality of IP modules based on the requirements of the embedded IC design. For each IP module, a corresponding integrity checker module is provided, wherein each integrity checker module has a port-wise correspondence with its corresponding IP module. The embedded IC design is simulated with the integrity checker modules rather than the IP modules for generating a netlist, which may be verified with respect to any interconnectivity errors associated with the IP modules.

22 Claims, 6 Drawing Sheets

Elementary nets between multi-and single-instance modules

FIG. 4C

Elementary nets between multi-instance modules

SYSTEM AND METHOD FOR VERIFYING IP INTEGRITY IN SYSTEM-ON-CHIP (SOC) DESIGN

PRIORITY UNDER 35 U.S.C. §119(e) & 37 C.F.R. §1.78

This nonprovisional application claims priority based upon the following prior U.S. provisional patent application entitled: "SYSTEM AND METHOD OF VERIFICATION OF IP INTEGRITY IN SOC," Application No. 60/789,784, filed on Apr. 6, 2006, in the name(s) of Karen Darbinyan, Hayk Chukhajyan, Albert Harutyunyan and Yervant Zorian, which is hereby incorporated by reference.

BACKGROUND

1. Technical Field

The present disclosure relates generally to integrated circuit (IC) design. More particularly, and not by way of any limitation, the present disclosure is directed to a system and method for verifying Intellectual Property (IP) components in an embedded IC such as a System-On-Chip (SOC) design.

2. Description of Related Art

Silicon manufacturing advances today allow true single-chip systems to be fabricated on a single die (i.e., System-On-Chip or SOC integration). However, there exists a "design gap" between today's electronic design automation (EDA) tools and the advances in silicon processes which recognizes that the available silicon real-estate has grown much faster than has designers' productivity, leading to underutilized silicon. Unfortunately, the trends are not encouraging: the "deep submicron" problems of non-convergent timing, complicated timing and extraction requirements, and other complex electrical effects are making silicon implementation harder. This is especially acute when one considers that various types of circuitry such as analog blocks, non-volatile memory (e.g., read-only memory or ROM), random access memories (RAMs), and other "non-logic" cells are being required. The gap in available silicon capacity versus design productivity means that without some fundamental change in methodology, it will take several staff years to develop leading-edge integrated circuits (ICs).

Design re-use has emerged as the key methodology solution for successfully addressing this time-to-market problem in semiconductor IC design. In this paradigm, instead of re-designing every part of every IC chip, engineers can re-use existing designs as much as possible and thus minimize the amount of new circuitry that must be created from scratch. It is commonly accepted in the semiconductor industry that one of the most prevalent and promising methods of design re-use is through what are known as Intellectual Property ("IP") components—pre-implemented, re-usable modules of circuitry that can be quickly inserted and verified to create a single-chip system. Such re-usable IP components are typically provided as megacells, cores, macros, embedded memories through generators or memory compilers, et cetera.

It is well known that complex SOCs of today may contain numerous third-party IP modules, possibly from different vendors. Usually an IP design package comprises multiple modules that are wrapped by the IP's top-level module. The IP package may be verified as a standalone design prior to integration into a SOC. However, in some instances, a user (i.e., system integrator) may wish to partition the IP into separate modules while integrating into its SOC. The necessity of such a partitioning is typically caused by SOC design flow peculiarities, mapping, power planning and place-and-routing considerations, and the like. In this case, the customer (i.e., user) does not use the IP's top-level module; rather, the individual IP modules are directly integrated into user's design hierarchy. After integration of such third-party IP modules into the SOC design net, there is, however, a potential risk of compromising the IP functionality. To be sure that the IP modules are properly functional, the SOC design net between instances of the IP modules must be established exactly in the same way it was established within the IP's top-level module. The violations of interconnections that can appear in the SOC design net are nearly impossible to detect using system-level functional simulation, especially when the IP is deeply embedded into the SOC. Additionally, the functional tests require costly long-running simulations. On the other hand, formal equivalence verification tools may offer a viable alternative to functional simulation. However, use of equivalence verification tools requires investments and deep knowledge of the integrated third-party IP structure.

SUMMARY

Broadly, the present disclosure provides a scheme for verification of IP integrity into a user's IC design. In one embodiment, the proposed methodology allows verifying interconnections between IP modules in the user's design prior to the functional verification thereof. The scheme posits that each module into which the IP design can be partitioned while integrated within the user's design is provided with a corresponding integrity checker module. Preferably, the integrity checker modules are identical to the corresponding IP modules in terms of module name and port list. A set of integrity checker modules may be referred to as an "Integrity Checker", which is simulated with the user's design instead of the IP modules for the user design's net verification. Thereafter, the Integrity Checker verifies the interconnections between the IP modules and provides the user with a corresponding verification report.

In one aspect, the present disclosure is directed to an IP integrity verification method operable with respect to integrating an IP design into a user's embedded IC design, comprising: partitioning the IP design into a plurality of IP modules based on requirements of the embedded IC design; for each IP module, providing a corresponding integrity checker module, wherein each integrity checker module has a port-wise correspondence with its corresponding IP module; simulating the embedded IC design with the integrity checker modules for validation of a netlist associated with the embedded IC design; and verifying interconnections between the IP modules with respect to any connectivity errors associated therewith.

In another aspect, the present disclosure is directed to a computer-implemented IP integrity verification system operable with respect to integrating an IP design into a user's embedded IC design, comprising: means for partitioning the IP design into a plurality of IP modules based on requirements of the embedded IC design; means for providing a corresponding integrity checker module with respect to each IP module, wherein each integrity checker module has a port-wise correspondence with its corresponding IP module; means for simulating the embedded IC design with the integrity checker modules for validation of a netlist associated with the embedded IC design; and means for verifying interconnections between the IP modules with respect to any connectivity errors associated therewith.

In a still further aspect, the present disclosure is directed to a computer program product operable to be executed in association with a computer system, the computer program product having instructions for verifying integrity of an IP design integrated into a user's embedded IC design, comprising: a code portion for partitioning the IP design into a plurality of IP modules based on requirements of the embedded IC design; a code portion for providing a corresponding integrity checker module with respect to each IP module, wherein each integrity checker module has a port-wise correspondence with its corresponding IP module; a code portion for simulating the embedded IC design with the integrity checker modules for validation of a netlist associated with the embedded IC design; and a code portion for generating a connectivity verification report with respect to any connectivity errors associated with interconnections between the IP modules.

BRIEF DESCRIPTION OF THE DRAWINGS

A more complete understanding of the present disclosure may be had by reference to the following Detailed Description when taken in conjunction with the accompanying drawings wherein.

DETAILED DESCRIPTION OF THE DRAWINGS

Figure 1:
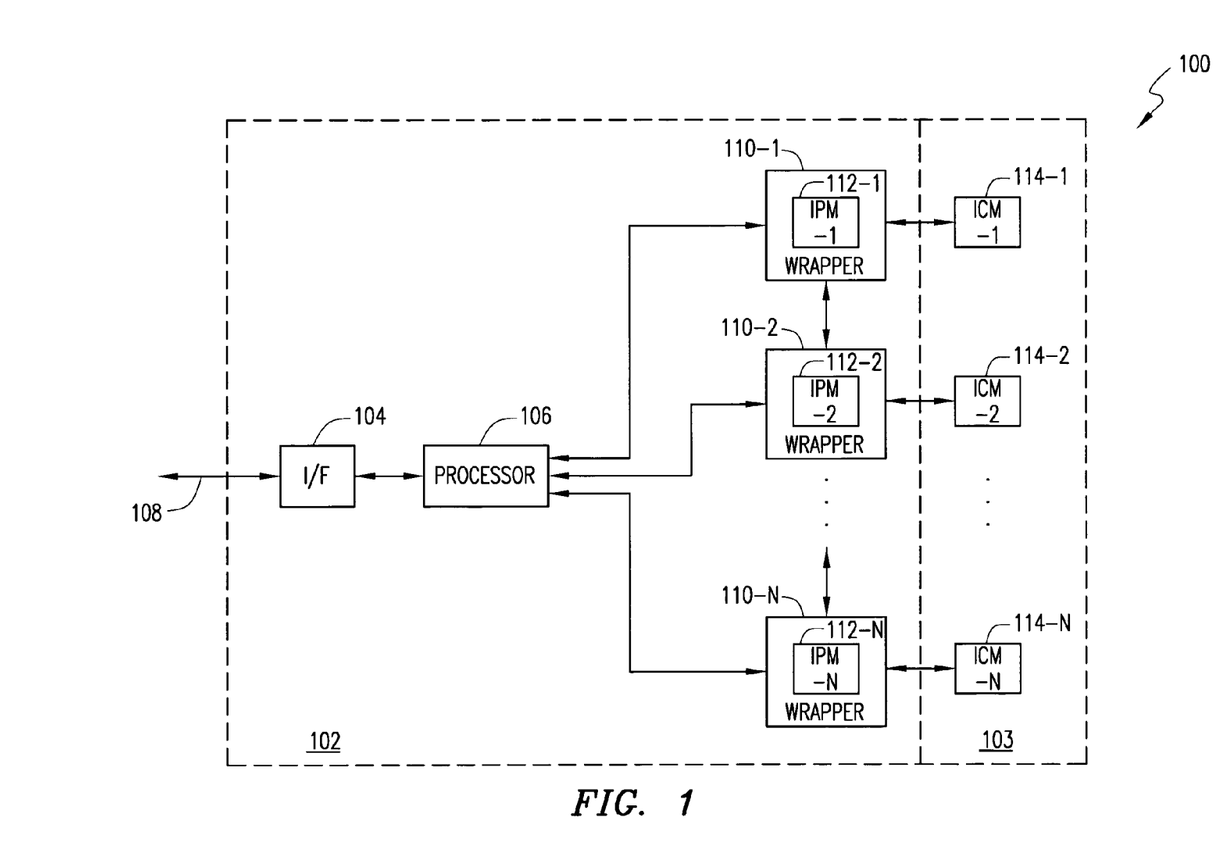
FIG. 1 depicts a high-level circuit abstraction scheme of an IC design wherein integration of a plurality of IP modules may be verified according to one embodiment of the present disclosure.

In the drawings, like or similar elements are designated with identical reference numerals throughout the several views thereof, and the various elements depicted are not necessarily drawn to scale. Referring now to FIG. 1, depicted therein is a high-level circuit abstraction scheme of an IC design wherein integration of a plurality of IP modules may be verified according to one embodiment of the present disclosure. By way example, SOC design 100 includes an IP design 102 that interfaces with the rest of the SOC design via a pathway 108 coupled to an interface 104. A processor 106 may be provided as part of the IP design for built-in-self-test and verification of a number of IP modules of the design. By way of further example, reference numerals 112-1 to 112-N refer to N IP modules, wherein each module is provided with a wrapper for facilitating test/verification/repair under the control of processor 106. Reference numerals 110-1 to 110-N refer to the wrappers associated with the IP modules of the IP design 102.

To verify that the integrity of the interconnections of the IP modules is maintained while integrated within SOC design 100, each IP module is provided with a corresponding integrity checker module, which is identical to the IP module in terms of module name as well as the port list (i.e., port-wise correspondence). As illustrated, reference numerals 114-1 to 114-N refer to N integrity checker modules (ICMs), each corresponding to an IP module. Although an ICM is provided to be port-wise identical with its corresponding IP module, the functionalities of the ICM and IPM are different, however. Whereas the IPM is comprised of the circuitry and functionality required as per its design objective (which is to be functionally and structurally integrated within the SOC embedded design), the ICM is provided with the functionality to verify and check the interconnections between its corresponding IPM and any other IPMs to which the corresponding IPM may be coupled. In essence, accordingly, the ICM is a "black box" equivalent of its corresponding IPM with respect to the respective module names and the port lists.

A plurality of ICMs may be referred to as an "Integrity Checker" block 103 which may be generated along with the generation of the IM modules, e.g., by a compiler, when the IP design 102 is to be integrated within the SOC design 100. Thereafter, the SOC design 100 is simulated with the ICM block rather than the IPMs for the SOC design net verification. While simulated, the ICM block is operable to verify the interconnections between the IPMs and provide connectivity reports with information regarding any connectivity errors such as, e.g., shorts, opens, misconnections, and the like.

Figure 2:
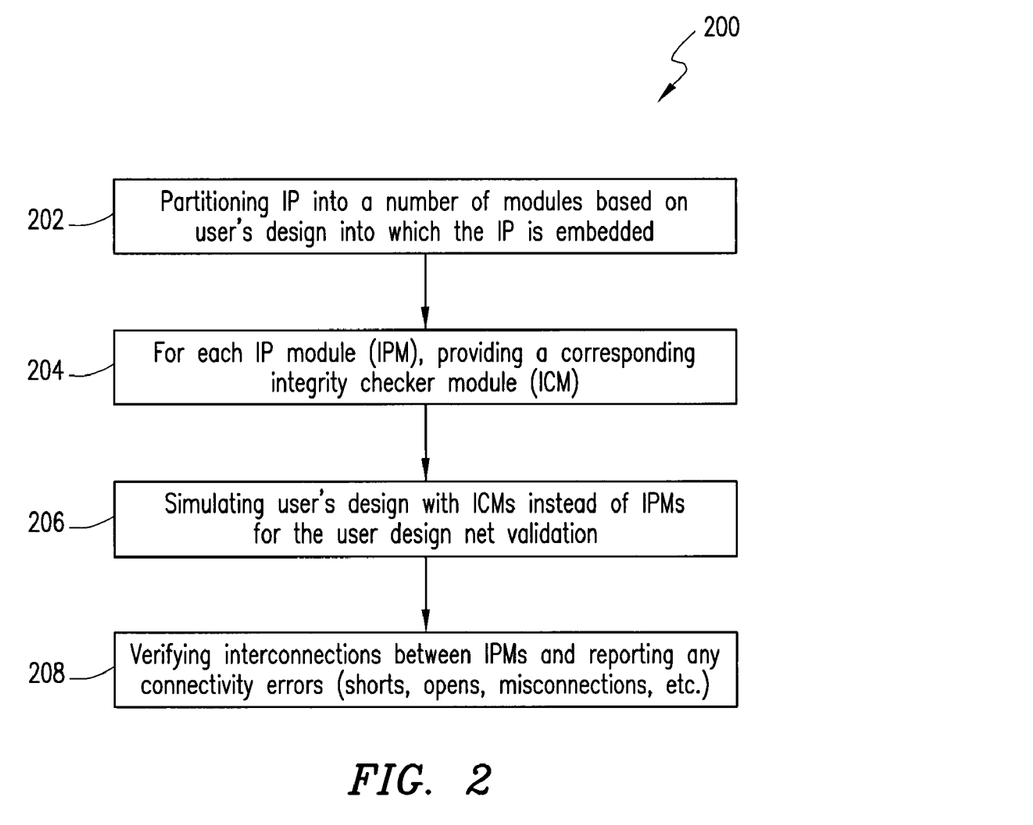
FIG. 2 is a flowchart of an IP integrity verification scheme in one embodiment.

FIG. 2 is a flowchart of an IP integrity verification scheme 200 in one embodiment. As will be appreciated by one skilled in the art, scheme 200 may be embodied as a computer-implemented methodology operable with a computer program product to be executed on a computer system, wherein the computer program product is comprised of various code portions (i.e., software) for performing the operations set forth herein. At block 202, an IP design may be partitioned into a number of IP modules based on the requirements of a target user IC design (i.e., a SOC) into which the IP modules are to be embedded. For each IP module, a corresponding ICM is provided (block 204). As alluded to previously, where a compiler-based IP design is provided (e.g., a memory compiler operable to generate a number of memory instances with different configurations), the corresponding ICMs may also be generated by the compiler code at the time IPM generation wherein the ICMs and IPMs are port-wise compatible. Thereafter, the user IC design is simulated with the ICMs instead of the IPMs in order to facilitate validation of a netlist associated with the user IC design (block 206). A code portion may be included for generating a connectivity report upon verification of interconnections between the IPMs, which preferably provides a customized report of errors, if any (block 208).

Based on the foregoing, it should be appreciated that for purposes of verification of integrity of IP embedded into a user's design, an Integrity Checker may preferably be provided with the following features:

1. Integrity Checker contains a set of hardware description language (HDL) modules (e.g., register transfer level or RTL-based modules), wherein an ICM is provided for each IP module that an IP design may be partitioned into. Integrity Checker modules are identical to the corresponding IP modules in terms of module name and port list. Being simulated in user's design instead of the IP modules, ICMs verify the interconnections between the IP modules regardless of complexity of the user's design hierarchy that the modules are integrated into.
2. Integrity Checker verifies the interconnections between the IP modules for all possible combinations of shortages, opens and misconnections. Preferably, Integrity Checker detects short-circuits regardless of the shorted net's drive strength.
3. Integrity Checker verifies all possible misconnections between different instances of IP's multi-instance modules.
4. Integrity of multiple IP designs may be verified with Integrity Checkers simultaneously.

5. User may not need any reference interconnection list for verification of design with Integrity Checker.
6. User needs no test bench to verify the integrity of IP in user's design with Integrity Checker. User may simulate user's design or user's sub-module, which contains the entire hierarchy of all IP modules or instances and their interconnections.
7. User needs no additional special-purpose tools to verify integrity of IP in user's design. In general, any industry standard simulation tool may be used.
8. While simulated, Integrity Checker generates a report file containing a readable list of violated interconnections and general summary of multi-module system (MMS) integrity verification.

Figure 3:
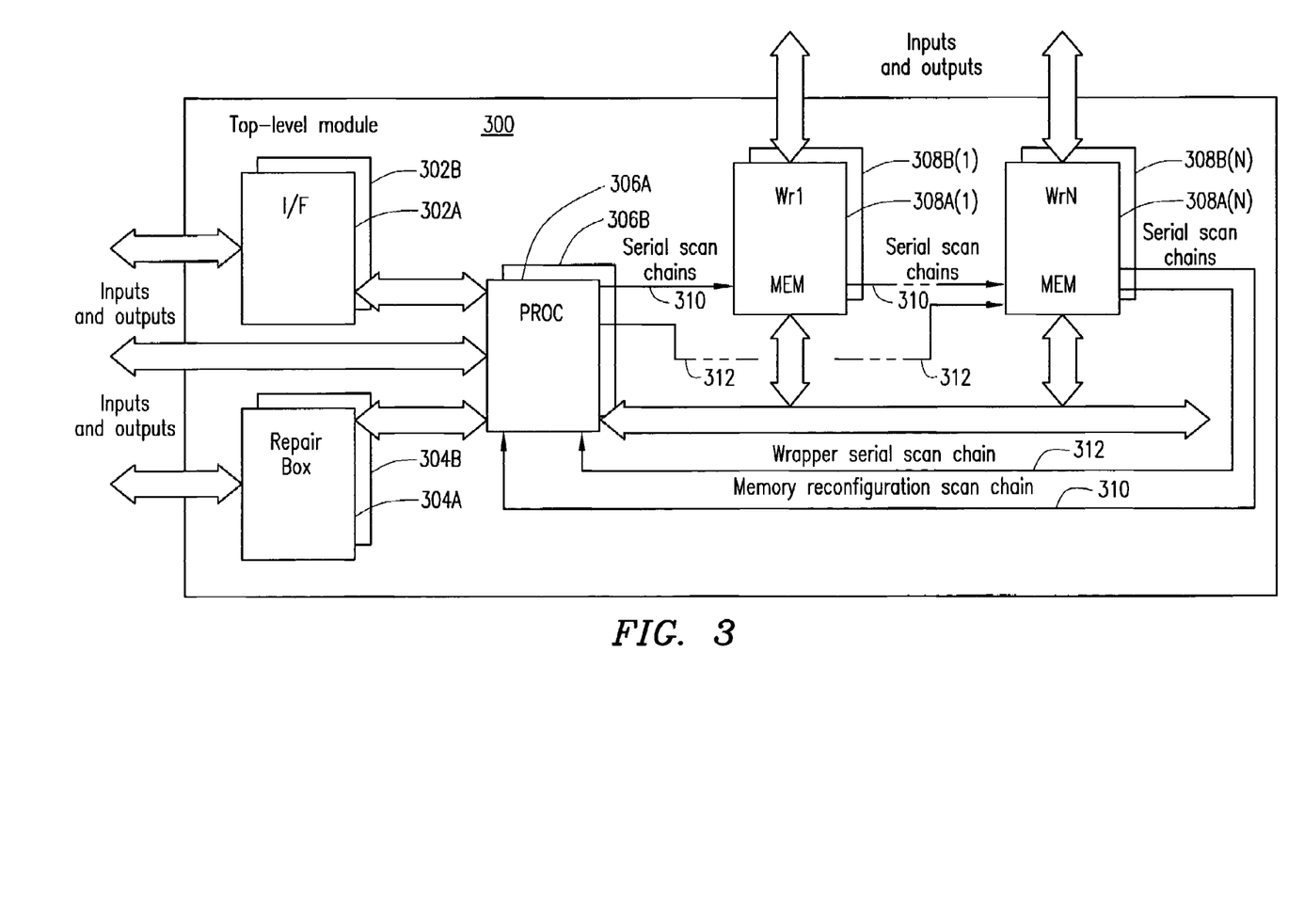
FIG. 3 is an exemplary top-level IP design wherein a plurality of IP modules are provided with a corresponding plurality of integrity checker modules in accordance with the teachings of the present patent application.

The foregoing teachings of the present patent disclosure are now illustrated with an exemplary top-level IP design. Taking reference to FIG. 3, a top-level IP module 300 exemplifies a Self-Test and Repair (STAR) Memory System (SMS) that may be embedded into a customer's IC design. Preferably, the following modules are provided: a STAR processor 306A, an interface module 302A, a repair box (e.g., a laser fuse box) module 304A, and a plurality of wrapped memory instances, e.g., MEM 308A(1) through 308A(N), all of which may be collectively referred to as SMS modules. In terms of integration, SMS modules are embedded by the SMS top-level module that instantiates the various internal modules and establishes interconnections between them. As illustrated in FIG. 3, each SMS module presented therein is provided with a corresponding integrity checker module. Reference numeral 302B refers to the ICM corresponding to the interface module 30A. Likewise, reference numerals 304B and 306B refer to ICMs corresponding to the repair box 304A and processor module 306A, respectively. With respect to the wrapped memory modules 308A(1)-308A(N), a corresponding plurality of ICMs 308B(1)-308B(N) are illustrated. The processor and memory modules are interconnected via reconfiguration scan chain 310 as well as wrapper serial scan chain 312 for effectuating self-test and repair.

In accordance with one design flow implementation, for verification of integrity of the SMS modules into the user's design, the user needs to replace the files containing the SMS modules with the corresponding files containing the ICMs or to change the corresponding paths in simulation command line. Then the user may simulate the whole customer design or the customer module, which contains the entire hierarchy of all SMS module instances and their interconnections. While simulated, the Integrity Checker verifies the interconnections between the various SMS modules as illustrated in FIG. 3. Preferably, the Integrity Checker also verifies the ordering scheme that the memory wrappers may follow in the serial scan chains. If the interconnections between the SMS modules or the wrapper ordering in the serial scan chains in the user's design do not match the interconnections and/or the wrapper ordering established within SMS top-level module, the Integrity Checker provides a corresponding error message. If integrity verification succeeds, a "Pass" message is reported at the end of simulation. Integrity Checker messages preferably contain results in integrity checking (list of violated connections, if any, or Pass messages) for each SMS module and summary for SMS IP as a whole.

Figure 4A:
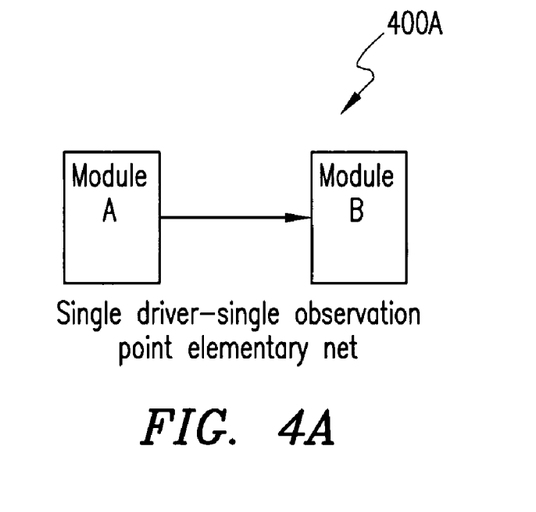
FIGS. 4A-4D depict exemplary elementary nets for purposes of the present patent application.

To facilitate verification of integrity of the SMS modules in a user's design, the entire SMS net presented in FIG. 3 may be partitioned into a number of elementary nets illustrated in FIGS. 4A-4D. Each of the exemplary elementary nets may be verified as described below. In FIG. 4A, reference numeral 400A refers to a "single driver-single observation point" elementary net. A stimulus signal is injected into the net by the output driver of module A and examined at the observation point (input of module B). If the observed signal matches the injected one then the elementary net is not violated. To make observable the opens and the shortages with other nets regardless of their drive strength, the stimulus signal contains the sequence of "1", "0" and "z" logic levels. To make observable the misconnections, each elementary net is activated within a predetermined time span. Out of its time span each elementary net is driven to logic "x" to make observable its shortages with the active elementary nets.

Figure 4B:
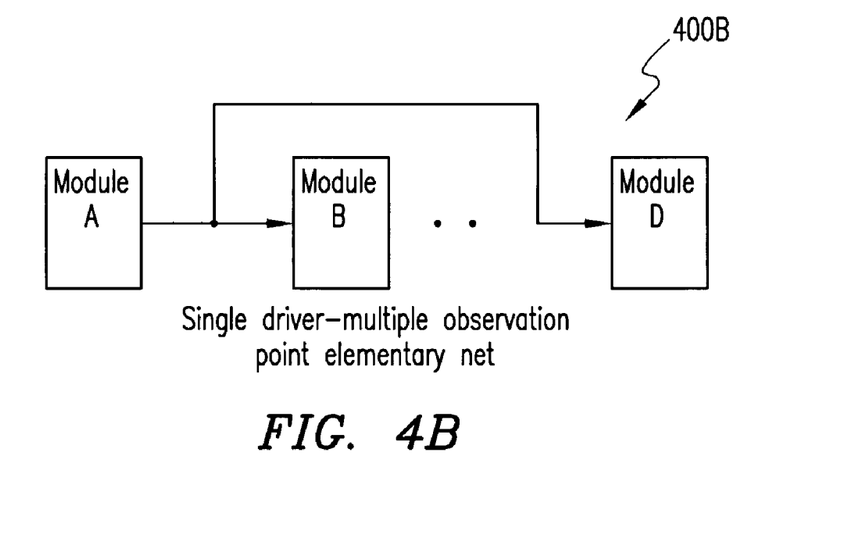
Figure 4C:
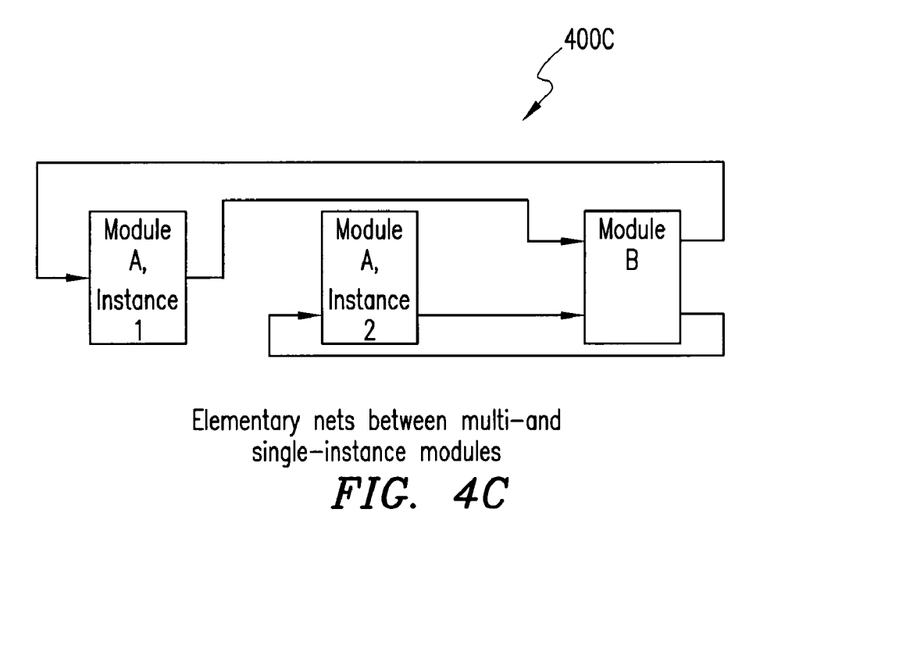
Figure 4D:
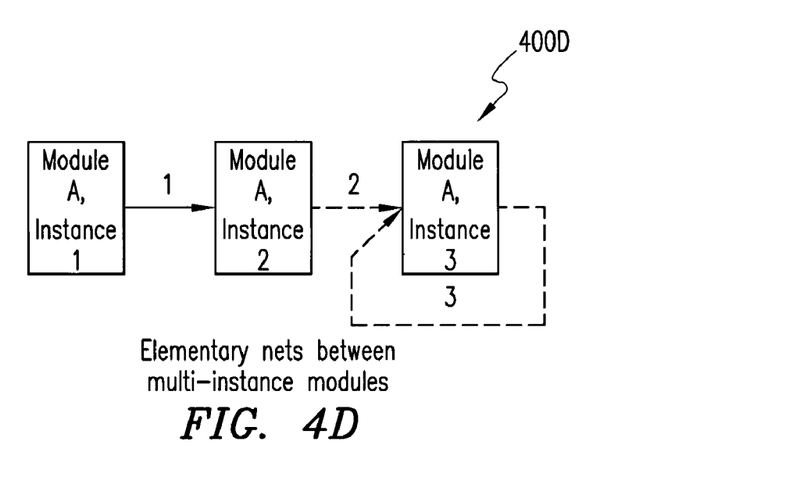

In FIG. 4B, reference numeral 400B refers to a "single driver-multiple observation point" elementary net. Such a net may be verified similar to the verification described for the singe driver-single observation point elementary net above. The stimulus signal is injected into the elementary net by the output of module A and is observed and verified at all its observation points (inputs of modules B, C, D and so on). Reference numeral 400C in FIG. 4C refers to an arrangement with a number of elementary nets between multi- and single-instance modules. This net arrangement includes four elementary nets between two instances of module A. Each of the elementary nets is verified in the way as has been described with respect to the singe driver-single observation point elementary net set forth above. The misconnections between the two instances of module A are verified as described below in reference to a general procedure of SMS integrity verification. Reference numeral 400D in FIG. 4D refers to an arrangement with a number of elementary nets between instances of a multi-instance module. This net arrangement comprises three instances of module A and two elementary nets. Each of the elementary nets is verified in the way as has been described with respect to the singe driver-single observation point elementary net set forth above. The misconnections between the three instances of module A are verified as described below in reference to SMS integrity verification.

In general, SMS integrity verification procedure comprises the following three verification stages. In verification stage 1, the Integrity Checker verifies interconnections between the processor and repair box modules and the processor and interface modules. Both the repair box and interface modules signalize to the processor through one of their output connections at the end of the first verification stage if a violation on their input connections is available. The processor module uses this information to make a general summary about SMS integrity checking (pass/fail) at the end of verification. In verification stage 2, the Integrity Checker verifies serial interconnections between the processor and memory wrappers, as well as the interconnections between memory wrappers and the ordering the memory wrappers follow in the scan chains. Each Integrity Checker memory wrapper module is provided with a unique ID number. The ID number is concatenated with a specific header combination that allows verifying violation of serial scan chains (including crossing between scan chains). Then the entire combination for all memory wrappers is shifted in the processor through the serial scan chains. The processor is operable to analyze the received sequence and determine the place in scan chains where the violation occurred. Further, the processor may also determine the memory wrapper that occupies a wrong place in the scan chains. A corresponding message may be provided by the processor, which may then terminate verification of other interconnections between the processor and memory wrapper modules. If the Integrity Checker finds no violations in serial scan chains and in the order the memory wrappers follow in scan chains, it verifies the parallel interconnections between the processor and memory wrapper modules. In verification stage 3, the Integrity Checker activates memory wrappers one after another, sending a specific sequence through the serial scan chains from the processor to memory wrappers. The activation of each memory wrapper launches the verification procedure for its sub-net. The driver of an elementary net that has multiple branches included into different sub-nets is toggled multiple times each time the corresponding sub-net is verified. Each memory wrapper signalizes to the processor module through serial scan chains at the end of the third verification stage if a violation on its input connections is available. The processor thereafter uses this information to make a general summary about SMS integrity checking (pass/fail) at the end of verification.

Figure 5:
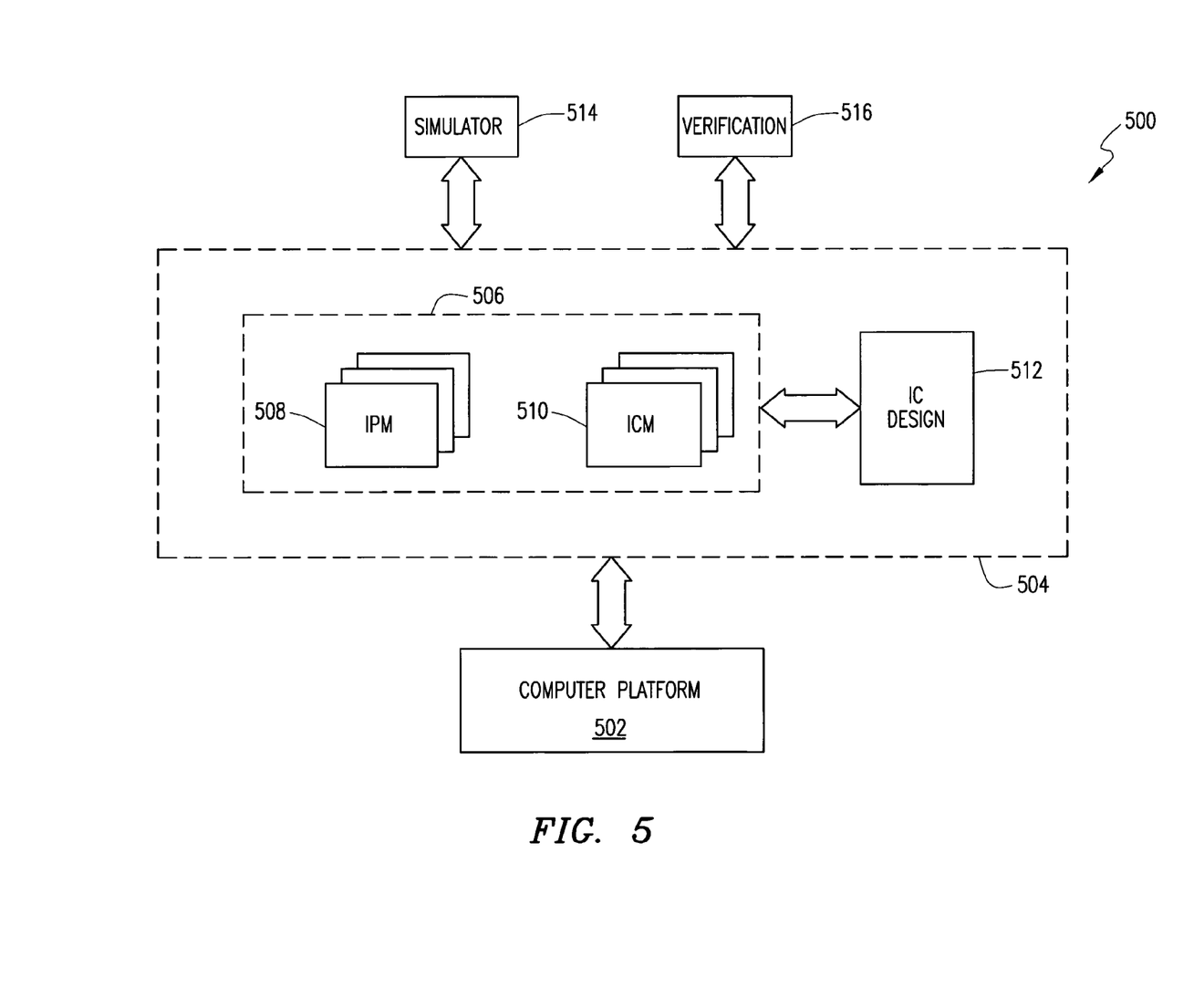
FIG. 5 depicts an exemplary computer system operable with software for effectuating an IP integrity verification scheme according to one embodiment of the present patent application.

FIG. 5 depicts an exemplary computer system 500 operable with software for effectuating an IP integrity verification scheme according to one embodiment of the present patent application. As illustrated, a computer hardware platform 502 may include any known or heretofore unknown computer architecture involving one or more processors, input/output devices, memory, bus structures, etc., for effectuating an IC design flow in a software environment 504. A compiler code portion 506 is operable to generate one or more IP modules 508 as well as the corresponding integrity checker modules 510. A target IC design 512 into which the IP modules are to be integrated is suitably provided in the design space. A simulator 514 and a verification block 516 are included for simulating the IC design 512 with the integrity checker modules as described in detail hereinabove.

It is believed that the operation and construction of the embodiments of the present disclosure will be apparent from the foregoing Detailed Description. While some aspects of the method and circuitry shown and described may have been characterized as being preferred, it should be readily understood that various changes and modifications could be made therein without departing from the scope of the present disclosure as set forth in the following claims.

What is claimed is:

1. An intellectual property (IP) integrity verification method performed by using a computer and operable with respect to integrating an IP design into a user's embedded integrated circuit (IC) design, the method comprising:
partitioning said IP design into a plurality of IP modules based on requirements of said embedded IC design;
for each IP module, providing a corresponding integrity checker module, wherein each integrity checker module has a port-list correspondence with its corresponding IP module, wherein each IP module and its corresponding integrity checker module have identical names and port lists;
simulating, by using the computer, said embedded IC design with said integrity checker modules instead of said corresponding IP modules for validation of a netlist associated with said embedded IC design; and
verifying interconnections between said IP modules with respect to any connectivity errors associated therewith.

2. The IP integrity verification method as set forth in claim 1, wherein said connectivity errors comprise at least one of shorts, opens and misconnections.

3. The IP integrity verification method as set forth in claim 1, wherein each integrity checker module is provided with functionality to check interconnections between its corresponding IP module and any other IP modules to which said corresponding IP module will be coupled.

4. The IP integrity verification method as set forth in claim 1, wherein said plurality of IP modules and said corresponding integrity checker modules are generated by a compiler operable to compile said IP design.

5. The IP integrity verification method as set forth in claim 1, wherein said IP design is partitioned based on said embedded IC design's place and routing constraints.

6. The IP integrity verification method as set forth in claim 1, wherein said IP design is partitioned based on said embedded IC design's power planning constraints.

7. The IP integrity verification method as set forth in claim 1, wherein said plurality of IP modules are integrated into different hierarchical levels of said embedded IC design.

8. The IP integrity verification method as set forth in claim 1, wherein said embedded IC design's netlist is partitioned into a number of elementary nets for verification.

9. A computer-implemented intellectual property (IP) integrity verification system operable with respect to integrating an IP design into a user's embedded integrated circuit (IC) design, comprising:
means for partitioning said IP design into a plurality of IP modules based on requirements of said embedded IC design;
means for providing a corresponding integrity checker module with respect to each IP module, wherein each integrity checker module has a port-list correspondence with its corresponding IP module, wherein each IP module and its corresponding integrity checker module have identical names and port lists;
means for simulating said embedded IC design with said integrity checker modules instead of said corresponding IP modules for validation of a netlist associated with said embedded IC design; and
means for verifying interconnections between said IP modules with respect to any connectivity errors associated therewith.

10. The computer-implemented IP integrity verification system as set forth in claim 9, wherein said connectivity errors comprise at least one of shorts, opens and misconnections.

11. The computer-implemented IP integrity verification system as set forth in claim 9, wherein each integrity checker module is provided with functionality to check interconnections between its corresponding IP module and any other IP modules to which said corresponding IP module will be coupled.

12. The computer-implemented IP integrity verification system as set forth in claim 9, wherein said plurality of IP modules and said corresponding integrity checker modules are generated by a compiler operable to compile said IP design.

13. The computer-implemented IP integrity verification system as set forth in claim 9, wherein said IP design is partitioned based on said embedded IC design's place and routing constraints.

14. The computer-implemented IP integrity verification system as set forth in claim 9, wherein said IP design is partitioned based on said embedded IC design's power planning constraints.

15. The computer-implemented IP integrity verification system as set forth in claim 9, wherein said plurality of IP modules are integrated into different hierarchical levels of said embedded IC design.

16. The computer-implemented IP integrity verification system as set forth in claim 9, wherein said embedded IC design's netlist is partitioned into a number of elementary nets for verification.

17. A computer program product operable to be executed in association with a computer system, said computer program product having instructions for verifying integrity of an intellectual property (IP) design integrated into a user's embedded integrated circuit (IC) design, comprising:

a code portion for partitioning said IP design into a plurality of IP modules based on requirements of said embedded IC design;

a code portion for providing a corresponding integrity checker module with respect to each IP module, wherein each integrity checker module has a port-list correspondence with its corresponding IP module, wherein each IP module and its corresponding integrity checker module have identical names and port lists;

a code portion for simulating said embedded IC design with said integrity checker modules instead of said corresponding IP modules for validation of a netlist associated with said embedded IC design; and a code portion for generating a connectivity verification report with respect to any connectivity errors associated with interconnections between said IP modules.

18. The computer program product as set forth in claim 17, wherein each integrity checker module is provided with functionality to check interconnections between its corresponding IP module and any other IP modules to which said corresponding IP module will be coupled.

19. The computer program product as set forth in claim 17, wherein said IP design is partitioned based on said embedded IC design's place and routing constraints.

20. The computer program product as set forth in claim 17, wherein said IP design is partitioned based on said embedded IC design's power planning constraints.

21. The computer program product as set forth in claim 17, wherein said plurality of IP modules are operable to be integrated into different hierarchical levels of said embedded IC design.

22. The computer program product as set forth in claim 17, further comprising a code portion for partitioning said embedded IC design's netlist into a number of elementary nets for verification.

* * * * *